(12) United States Patent
Kawakami et al.

(10) Patent No.: US 8,042,427 B2
(45) Date of Patent: Oct. 25, 2011

(54) BICYCLE SHIFTER

(75) Inventors: Tatsuya Kawakami, Sakai (JP); Shingo Funai, Osaka (JP)

(73) Assignee: Shimano Inc., Osaka (JP)

(*) Notice: Subject to any disclaimer, the term of this patent is extended or adjusted under 35 U.S.C. 154(b) by 728 days.

(21) Appl. No.: 11/510,744

(22) Filed: Aug. 28, 2006

(65) Prior Publication Data
US 2007/0199401 A1 Aug. 30, 2007

(30) Foreign Application Priority Data

Feb. 16, 2006 (JP) ................. 2006-039620

(51) Int. Cl.
*F16C 1/10* (2006.01)
*G05G 11/00* (2006.01)
*B62K 21/12* (2006.01)

(52) U.S. Cl. .......... 74/502.2; 74/489; 74/551.8

(58) Field of Classification Search .......... 74/502.2, 74/489, 473.14, 473.15, 551.8; F16C 1/10; B62L 3/02
See application file for complete search history.

(56) References Cited

U.S. PATENT DOCUMENTS

| | | | | |
|---|---|---|---|---|
| 3,776,333 A | * | 12/1973 | Mathauser | ........... 188/344 |
| 3,891,177 A | * | 6/1975 | Jerrel | ........... 248/352 |
| 4,974,469 A | | 12/1990 | Romano | |
| 6,305,237 B1 | | 10/2001 | Ichida | |
| 2002/0187867 A1 | * | 12/2002 | Ichida et al. | ........... 474/82 |
| 2006/0053940 A1 | | 3/2006 | McLaughlin et al. | |

FOREIGN PATENT DOCUMENTS

| | | |
|---|---|---|
| EP | 1 046 385 A2 | 10/2000 |
| JP | S54-28851 U | 2/1979 |
| JP | S63-312291 A | 12/1988 |
| JP | S63-315390 A | 12/1988 |
| JP | H01-134591 U | 9/1989 |
| JP | 2000-225974 A | 8/2000 |

OTHER PUBLICATIONS

Shimano Inc. The System Component Group for Recreational Cycling Exage; sales manual; p. 17-18; Model M450/M350.

* cited by examiner

*Primary Examiner* — Justin Krause
*Assistant Examiner* — Daniel Yabut
(74) *Attorney, Agent, or Firm* — Global IP Counselors, LLP (57) ABSTRACT

A bicycle shifter is configured to ensure that the position where a main shifter body is attached to a bicycle can be easily varied. The bicycle shifter basically has a mounting bracket, a main shifter body and a fixing mechanism. The mounting bracket is preferably configured be fixed to a handlebar of a bicycle. The main shifter body is mounted on the mounting bracket and has a shifter mechanism in the interior. The fixing mechanism is a mechanism whereby the main shifter body can be fixed in place on the mounting bracket at an arbitrary attachment position between a first position and a second position.

3 Claims, 12 Drawing Sheets

BICYCLE SHIFTER

CROSS-REFERENCE TO RELATED APPLICATIONS

This application claims priority under 35 U.S.C. §119 to Japanese Patent Application No. 2006-039620 on Feb. 16, 2006. The entire disclosure of Japanese Patent Application No. 2006-039620 is hereby incorporated herein by reference.

BACKGROUND OF THE INVENTION

1. Field of the Invention

This invention generally relates to a bicycle shifter. More specifically, the present invention relates to a bicycle shifter that is mounted on a bicycle and that is used to shift the gears of a bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the shifter of the bicycle.

A shifter of a bicycle is typically linked to a shifting device by a Bowden shifting cable, for example. The shifting device is made to shift the gears by operating an operating member in the form of a lever, for example, on the shifter. A conventional shifter has a bracket mounted on a handlebar, and a main shifter body mounted on the mounting bracket. In conventional practice, in cases in which a shifter is provided separately from a brake lever, normally, the shifter is attached to the handlebars inside a bracket on the brake lever. If the shifter is attached to the handlebar within the brake lever, then the shifter may be difficult to operate, depending on the shapes of the operating member(s) of the shifter.

There are conventional shifters in which the main shifter body is capable of moving in relation to handlebar attachment part, and the position where the main shifter body is attached can be varied in the axial direction of the handlebar (see, for example, Japanese Unexamined Utility Model Application No. 1-134591). In this conventional shifter, the mounting bracket is divided into two members: a boss part mounted on the handlebar, and a fixing member for fixing the boss in place on the handlebar. The fixing member is a cylindrical member having a large hole into which the boss part fits, a small hole into which the handlebar fits, and a slot formed in the axial direction. The fixing member is provided with a fixing bolt for making the slot narrow. As a result of tightening the fixing bolt and narrowing the slot, the fixing member is fixed in place on the handlebar. The boss part is then also fixed in place on the handlebar. The position where the main shifter body is attached can be varied in relation to the boss part and set to an arbitrary position in the axial direction of the handlebar. This can be achieved by varying the position where the boss part fits in the large hole in the axial direction.

With the conventional configuration previously described, the fixing bolt of the fixing member must be loosened to vary the position where the main shifter body is attached. When the fixing bolt is loosened, the alignment of the fixing member on the mounting bracket sometimes changes because the fixing member is capable of rotating in relation to the boss part. Therefore, the alignment of the main shifter body around the axis of the handlebar also changes. Since the alignment of the main shifter body also changes when the attachment position of the main shifter body is varied, the alignment of the main shifter body must be adjusted, and such position alignment is troublesome.

In view of the above, it will be apparent to those skilled in the art from this disclosure that there exists a need for an improved bicycle shifter. This invention addresses this need in the art as well as other needs, which will become apparent to those skilled in the art from this disclosure.

SUMMARY OF THE INVENTION

One object of the present invention is to provide a bicycle shifter that can be easily attached to the bicycle in an adjustable manner.

The foregoing objects can basically be attained by providing a bicycle shifter that basically comprises a bracket, a main shifter body, and a fixing mechanism in accordance with a first aspect of the present invention. The mounting bracket is configured to be fixedly coupled to a bicycle. The main shifter body includes a shifter mechanism disposed within an interior of the main shifter body. The fixing mechanism fixes the main shifter body and the mounting bracket together in a predetermined relative angular orientation. The main shifter body is adjustable relative to the mounting bracket by the fixing mechanism such that the main shifter body is selectively retainable in a plurality of different attachment positions relative to the mounting bracket between at least a first position and a second position without completely detaching the main shifter body from the mounting bracket and while maintaining the predetermined relative angular orientation.

In this shifter, when the attachment position of the main shifter body is varied, the main shifter body can be attached at an arbitrary position between the first position and the second position by the fixing mechanism. Since the design allows for the attachment position of the main shifter body to be varied in relation to the mounting bracket by the fixing mechanism, and set to an arbitrary position between the first position and the second position, the alignment (the predetermined relative angular orientation) of the main shifter body does not change when the attachment position of the main shifter body is varied. Therefore, the position where the main shifter body is attached to the bicycle can be easily varied.

According to a second aspect of the present invention, the bicycle shifter of the first aspect of the present invention is provided such that the mounting bracket is configured to be fixedly coupled on a handlebar of the bicycle, and the first and second positions are disposed along a path that is generally parallel to a longitudinal direction of the handlebar. In this case, the mounting bracket can be disposed on either the interior or exterior of a brake lever mounted on the handlebar.

According to a third aspect of the present invention, the bicycle shifter of the second aspect of the present invention is provided such that the fixing mechanism comprises: an elongated slot formed in one of the mounting bracket and the main shifter body, and that extends in the longitudinal direction; at least one female threaded part formed in one of the mounting bracket and the main shifter body; and a bolt passing through the slot and screwed into the female threaded part. In this case, the main shifter body can be fixed in place by passing the bolt through the slot and screwing the bolt into the female threaded part, and the main shifter body can be fixed in place at an arbitrary attachment position between the first position and the second position at either end of the slot by shifting the attachment position in the longitudinal direction of the slot.

According to a fourth aspect of the present invention, the bicycle shifter of the third aspect of the present invention is provided such that the fixing mechanism further includes a rotation-stopping mechanism for stopping the main shifter body from rotating relative to the mounting bracket. In this case, the main shifter body does not rotate and can maintain its alignment even if the main shifter body is fixed in place with only one bolt.

According to a fifth aspect of the present invention, the bicycle shifter of the fourth aspect of the present invention is provided such that the rotation-stopping mechanism comprises: a plurality of rotation-stopping protrusions on one of the mounting bracket and the main shifter body; and a plurality of rotation-stopping recesses on the other of the mounting bracket and the main shifter body that are interlock with the rotation-stopping protrusions to stop the main shifter body from rotating relative to the mounting bracket. In this case, the main shifter body can be stopped from rotating and can be guided in the longitudinal direction as a result of the recesses and protrusions fitting together.

According to a sixth aspect of the present invention, the bicycle shifter of any one of the third through fifth aspects of the present invention is further provided with a loosening-prevention member linking the mounting bracket and the main shifter body to prevent the main shifter body from coming loose from the mounting bracket. In this case, the main shifter body does not come loose from the mounting bracket even when the fixed attachment of the fixing mechanism is released.

According to a seventh aspect of the present invention, a bicycle shifter is basically provided with a bracket, a main shifter body and a fixing mechanism. The mounting bracket is configured to be fixedly coupled to a bicycle. The main shifter body includes a shifter mechanism disposed within an interior of the main shifter body, the shifter mechanism including a shift positioning member configured to rotate around a shaft member. The fixing mechanism fixes the main shifter body and the mounting bracket together in a predetermined relative angular orientation by a fixing member that is attached to the shaft member such that the main shifter body is selectively retainable in a plurality of different attachment positions relative to the mounting bracket between a first end position and a second end position while maintaining the predetermined relative angular orientation. In this shifter, when the attachment position of the main shifter body is varied, the main shifter body can be attached to the mounting bracket at least at a first position and a second position by means of the fixing mechanism. Since the position where the main shifter body is attached in relation to the mounting bracket can be varied between a first position and a second position by securing the fixing member to the shaft member, the alignment of the main shifter body does not change when the attachment position of the main shifter body is varied. Therefore, the position where the main shifter body is attached on the bicycle can be easily varied. Moreover, the structure of the fixing mechanism is simplified because normally the attachment is secured by using the shaft member, which is used as the primary shaft of the shifter mechanism.

According to an eighth aspect of the present invention, the bicycle shifter the seventh aspect of the present invention is provided such that the shaft member includes a female threaded part at the distal end, and the fixing member includes a first bolt that is screwed into the female threaded part. In this case, the main shifter body can easily be fixed in place in a manner that allows its position to be varied. This is achieved by screwing the first bolt into the female threaded part of the shaft member.

According to a ninth aspect of the present invention, the bicycle shifter of the eighth aspect of the present invention is provided such that the fixing member further includes a second bolt that is screwed into a female threaded part of the main shifter body but not into the shaft member. In this case, since the main shifter body is fixed in place by using two bolts, the strength of the attachment is increased and the main shifter body does not rotate.

According to the present invention, the design allows for the attachment position of the main shifter body in relation to the mounting bracket to be varied by the fixing mechanism to an arbitrary position between the first position and the second position, and the alignment of the main shifter body therefore does not change when the attachment position of the main shifter body is varied. Accordingly, the position where the main shifter body is attached to the bicycle can be easily varied.

According to the other inventions of the present invention, the alignment of the main shifter body does not change when the attachment position of the main shifter body is varied. This is because the position where the main shifter body is attached in relation to the mounting bracket can be varied between a first position and a second position by means of a fixing member that is fitted over the shaft member. Therefore, the position where the main shifter body is attached to the bicycle can be easily varied. Moreover, the fixing structure is simplified because normally the attachment is secured by using the shaft member, which is used as the primary shaft of the shifter mechanism.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
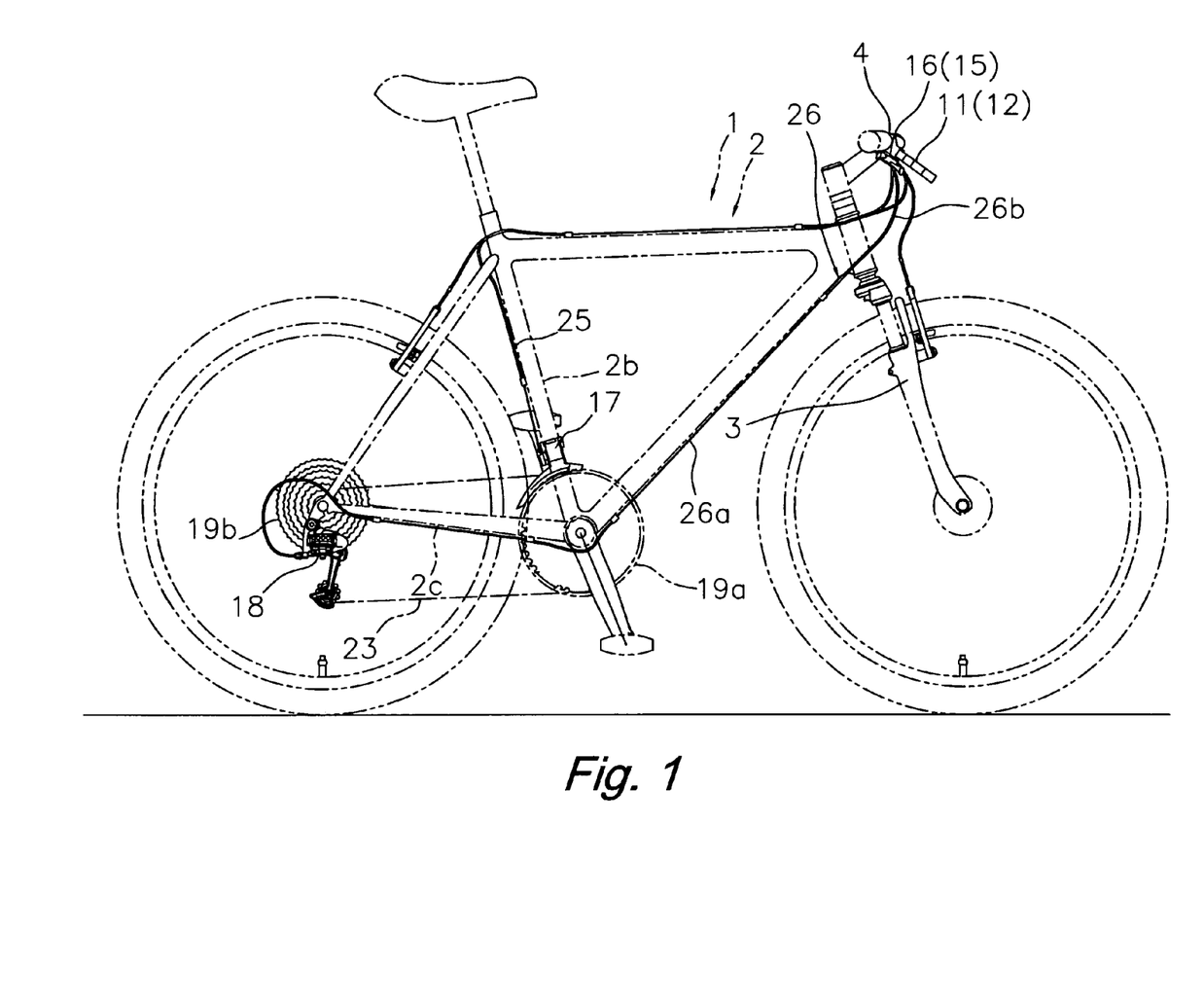
FIG. 1 is a right side elevational view of a bicycle using a pair of bicycle shifters in accordance with a first embodiment of the present invention.

Referring initially to FIG. 1, a bicycle 1 is illustrated that is equipped with the present invention. The bicycle 1 includes a frame 2 which has a suspension fork 3 and a handlebar 4 fixed in place at the top of the suspension fork 3. The handlebar 4 has a pair of (rear and front) brake levers 11 and 12 mounted thereon, and a pair of (front and rear) shifter units 15 and 16 mounted thereon. The front and rear shifter units 15 and 16 are disposed near the brake levers 12 and 11, respectively, on the inside of the brake levers 12 and 11 on the handlebar 4. The front shifter unit 15 and the rear shifter unit 16 are mirror-images, since their configurations and operations are identical, except for the number of gearshift positions. In particular, the rear shifter unit 16 has more gearshift positions than the front shifter unit 15. Thus, only the rear shifter unit 16 will be described in the following description in detail.

A front derailleur 17 constitutes an external shifting device that is mounted in the middle of the frame 2. A rear derailleur 18 constitutes an external shifting device that is mounted at the back end of the frame 2. The front derailleur 17 is disposed below a seat tube 2b of the frame 2, for example, and guides a chain 23 onto any one of three sprockets of a front chain wheel 19a, for example. The rear derailleur 18 is disposed at the back end of a chain stay 2c of the frame 2, and guides the chain 23 onto any one of eight sprockets of a rear chain wheel 19b, for example. The front derailleur 17 and the rear derailleur 18 are linked to front and rear shifter units (examples of shifters) 15 and 16 via front and rear shifting cables 25 and 26.

Figure 2:
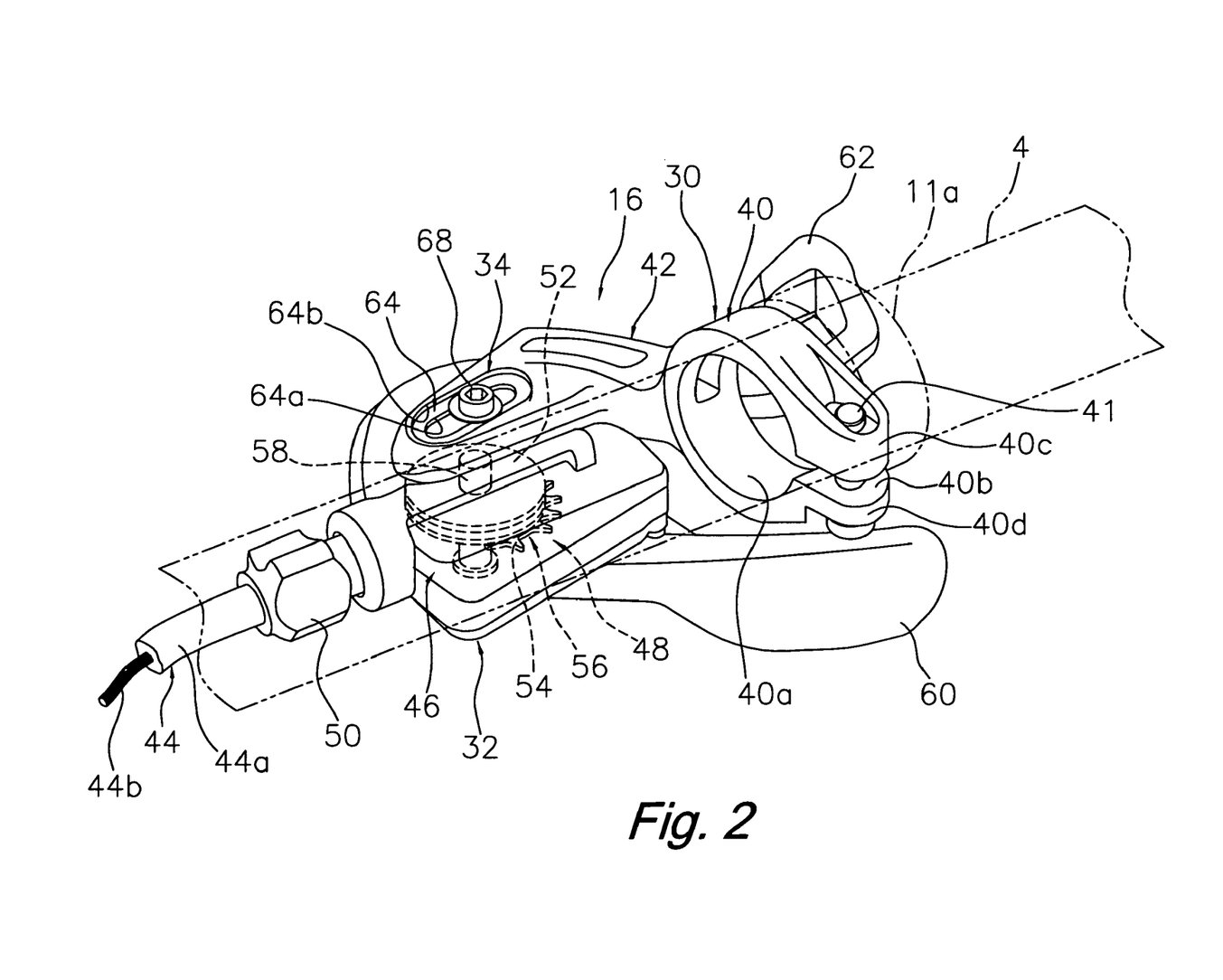
FIG. 2 is a rear perspective view of a rear shifter unit in accordance with the first embodiment of the present invention.
Figure 3:
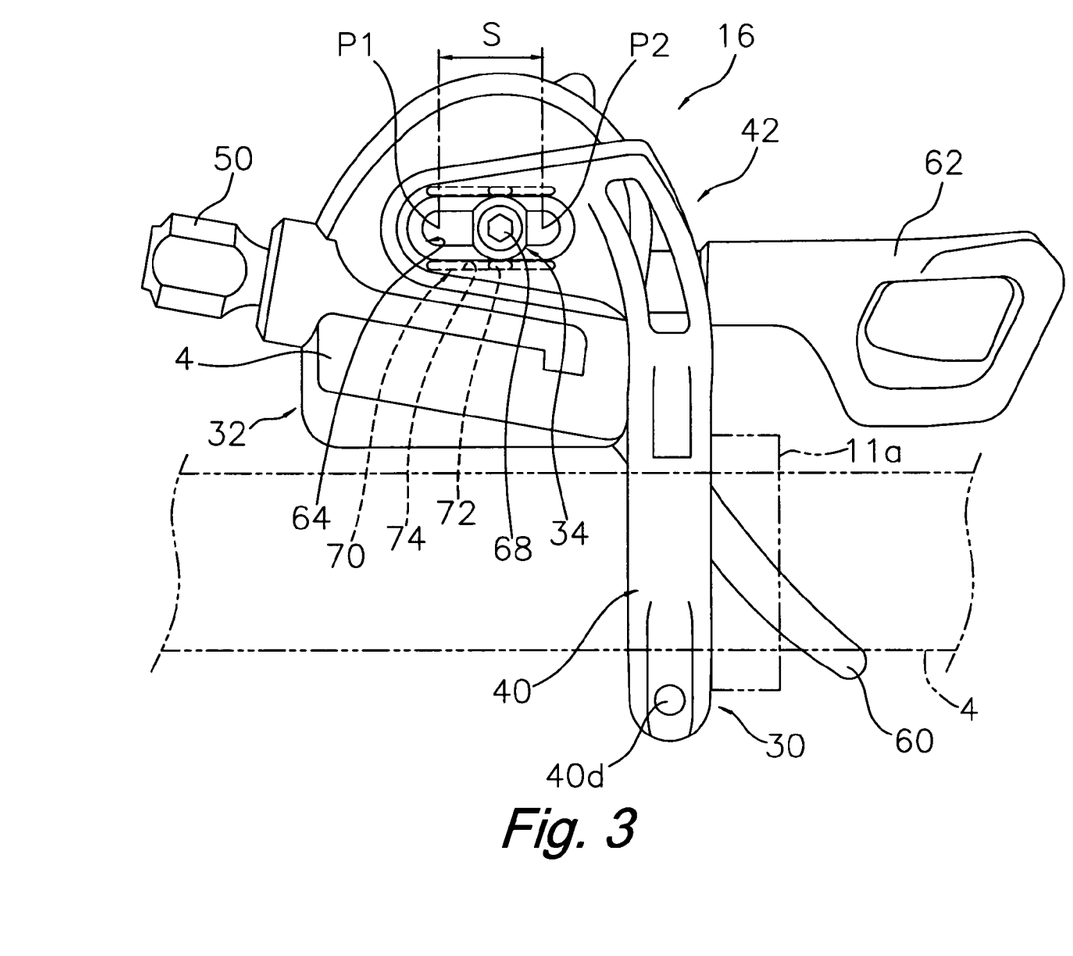
FIG. 3 is a top plan view of the rear shifter unit in accordance with the first embodiment of the present invention.
Figure 4:
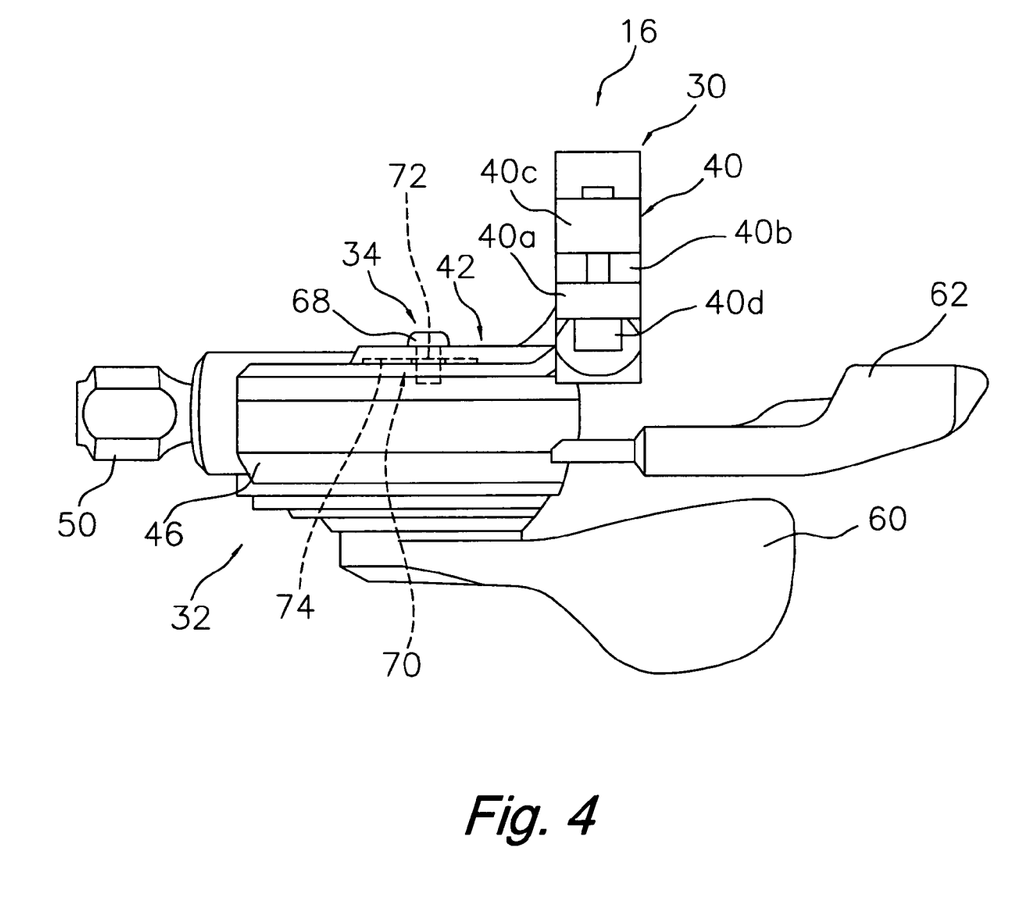
FIG. 4 is a side elevational view of the rear shifter unit in accordance with the first embodiment of the present invention.

The rear shifter unit 16 basically includes a bracket 30, a main shifter body 32 and a fixing mechanism 34. The bracket 30 is configured and arranged to be fixed in place on the handlebar 4 on the inside of a brake bracket 11a of the front brake lever 11. The main shifter body 32 is mounted on the mounting bracket 30. The fixing mechanism 34 is configured and arranged for fixing the main shifter body 32 in place on the mounting bracket 30, as shown in FIGS. 2 through 4.

The mounting bracket basically includes a band clamp 40, a clamping bolt 41 and an attachment arm 42. The band clamp 40 is fixed in place on the handlebar 4. The attachment arm 42 extends from the band clamp 40 and curves inward (to the left in FIG. 2) at the middle. The band clamp 40 defines an handlebar attachment hole 40a through which the handlebar 4 runs. A slit 40b is formed in the periphery of the band clamp 40 in the radial direction relative to the attachment hole 40a so that the band clamp 40 can be squeezed to change the diameter of the attachment hole 40a. The band clamp 40 has first and second clamping parts 40c and 40d formed on opposite sides of the slit 40b. The first and second clamping parts 40c and 40d protrude generally in the radial direction relative to the attachment hole 40a. The band clamp 40 is fixed in place on the handlebar 4 by tightening the clamping bolt 41 that spans across the slit 40b and runs through both of the clamping parts 40c and 40d, so that the slit 40b is narrowed.

The main shifter body 32 has a shifter housing 46 and a shifter mechanism 48. The housing 46 is fixed in place on the mounting bracket 30. The shifter mechanism 48 is mounted inside the housing 46. The housing 46 is provided with an outer securing part 50 in which an outer casing 44a of a shifting cable 44 is secured.

The shifter mechanism 48 has a winding body 52 and a positioning mechanism 56. The winding body 52 is configured and arranged for winding an inner wire 44b of the shifting cable 44. The positioning mechanism 56 includes a positioning member 54 for positioning the winding body 52 at a shifting position. The winding body 52 and the positioning member 54 are supported by a shaft member 58 that is supported in the housing 46, and rotate around the shaft member 58. The shifter mechanism 48 also has a winding lever 60 and a release lever 62. The winding lever 60 is configured and arranged for rotating the positioning member 54 in the cable winding direction by an amount equivalent to one or more shifting positions. The release lever 62 is configured and arranged for rotating the positioning member in the direction of releasing the inner wire 44b of the shifting cable 44. The levers 60 and 62 are pivotally mounted on the housing 46 so as to be turn. The release lever 62 is configured and arranged to release the inner wire 44b of the shifting cable 44 by turning the release lever 62 in either one of the two turning directions.

The fixing mechanism 34 is capable of fixing the main shifter body 32 in place at an arbitrary attachment position between a first position P1 and a second position P2 disposed along the longitudinal direction (to the left and right in FIG. 3) of the handlebar 4, as shown in FIG. 3. Specifically, the fixing mechanism 34 is capable of varying the attachment position of the main shifter body 32 in the longitudinal direction without completely detaching the main shifter body 32 from the mounting bracket 30 and while maintaining the predetermined relative angular orientation of the main shifter body 32 relative to the mounting bracket 30. The distance S between the first position P1 and the second position P2 is preferably greater than the width of the brake bracket 11a (about 10 to 30 mm, for example). In the first embodiment, this distance S is about 15 mm.

Figure 5:
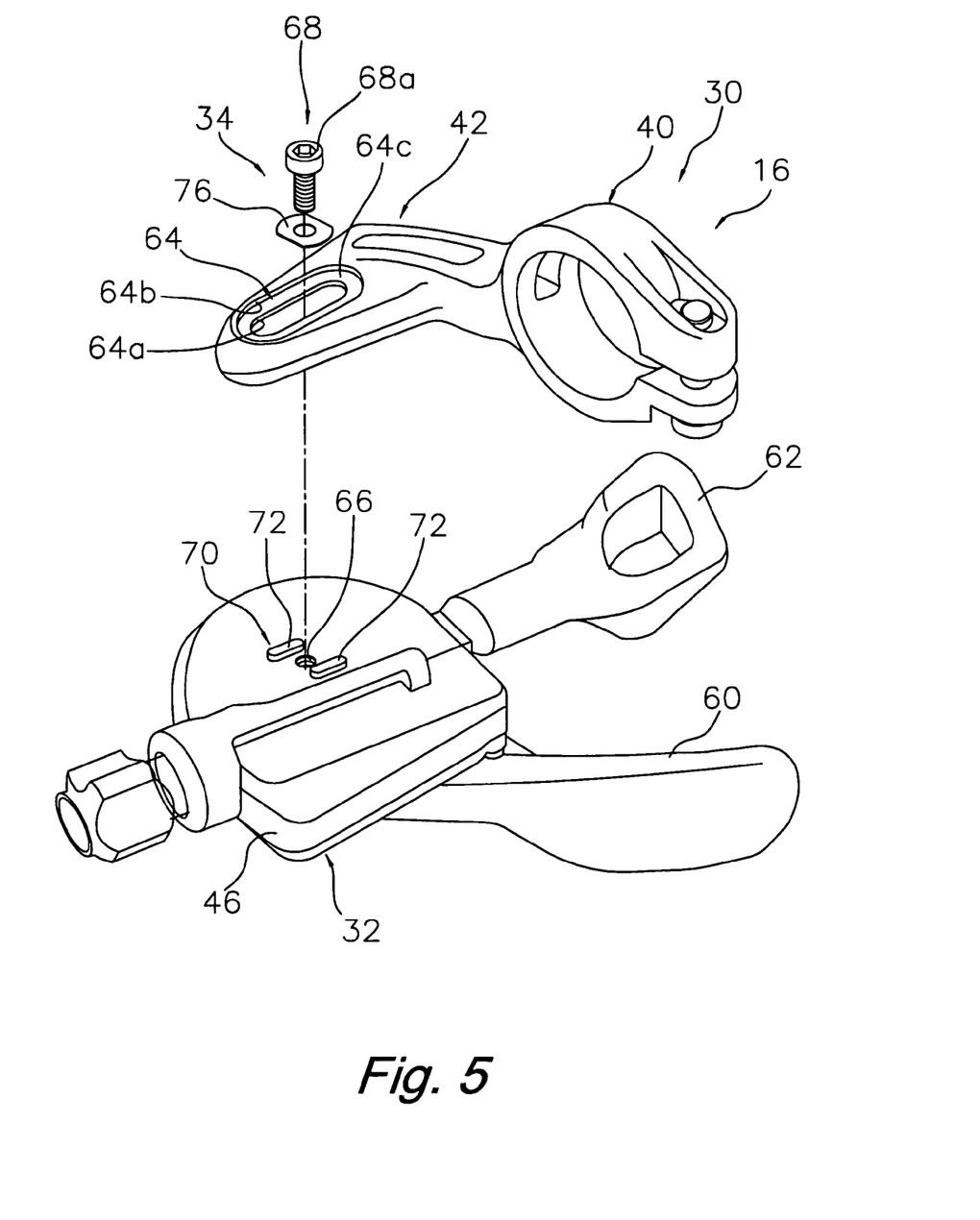
FIG. 5 is an exploded perspective view of the rear shifter unit in accordance with the first embodiment of the present invention.

The fixing mechanism 34 has a slot 64 extending in the longitudinal direction in the distal end of the attachment arm 42 of the mounting bracket 30, a female threaded part 66 formed at the top surface of the housing 46 of the main shifter body 32, and a bolt 68 that is passed through the slot 64 and screwed into the female threaded part 66, as shown in FIG. 5. The slot 64 has an oval-shaped first slot 64a formed in the longitudinal direction, and a second slot 64b that is wider than the first slot. The female threaded part 66 is disposed above the shaft member 58 in the first embodiment. The female threaded part 66 may also be formed at a location other than above the shaft member 58. The bolt 68 is a bolt that is provided with a hexagonal hole and has a head 68a in which the hexagonal hole is formed, and the head 68a is disposed in a step 64c between the first slot 64a and the second slot 64b via a washer 76. Therefore, in the first embodiment, the head 68a is disposed in the second slot 64b, and the head 68a is kept from protruding from the attachment arm 42.

The fixing mechanism 34 further comprises a rotation-stopping mechanism 70 for stopping the main shifter body 32 from rotating relative to the mounting bracket 30. The rotation-stopping mechanism 70 has a pair of rotation-stopping protrusions 72 formed on the top surface of the housing 46 of the main shifter body 32, and a pair of rotation-stopping recesses 74 that are provided on the underside of the attachment arm 42 of the mounting bracket 30. The rotation-stopping protrusions 72 are oval shapes in the longitudinal direction. The rotation-stopping recesses 74 are elongated, oval shapes that extend in a longitudinal direction of the oval shapes longer than the rotation-stopping protrusions 72. When the bracket 30 is fixed to the main shifter body 32 by the fixing mechanism 34, the rotation-stopping recesses 74 fit over the rotation-stopping protrusions 72 to stop the main shifter body 32 from rotating relative to the bracket 30, as shown in FIGS. 3 through 5.

Figure 6:
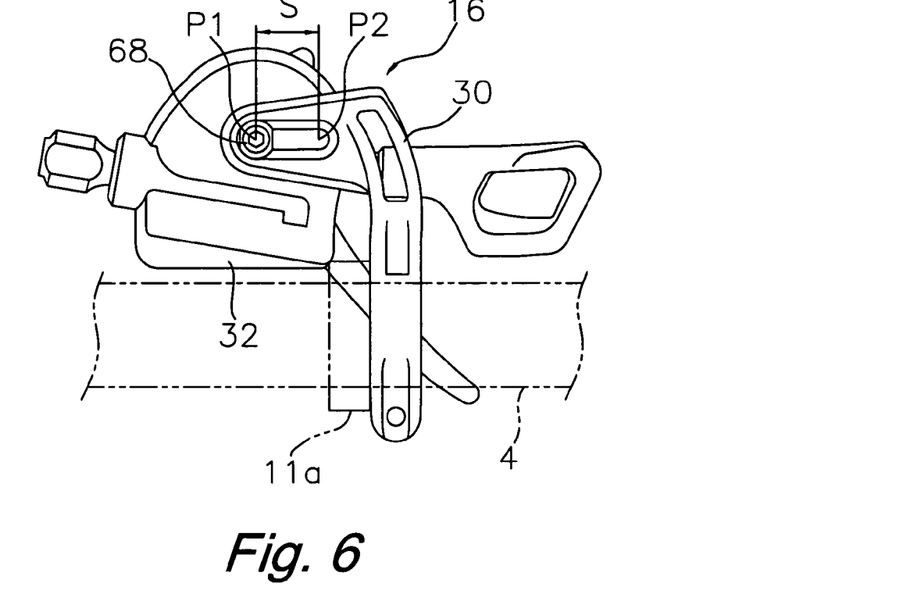
FIG. 6 is a top plan view of the rear shifter unit with the main shifter body fixed in place at the first position.
Figure 7:
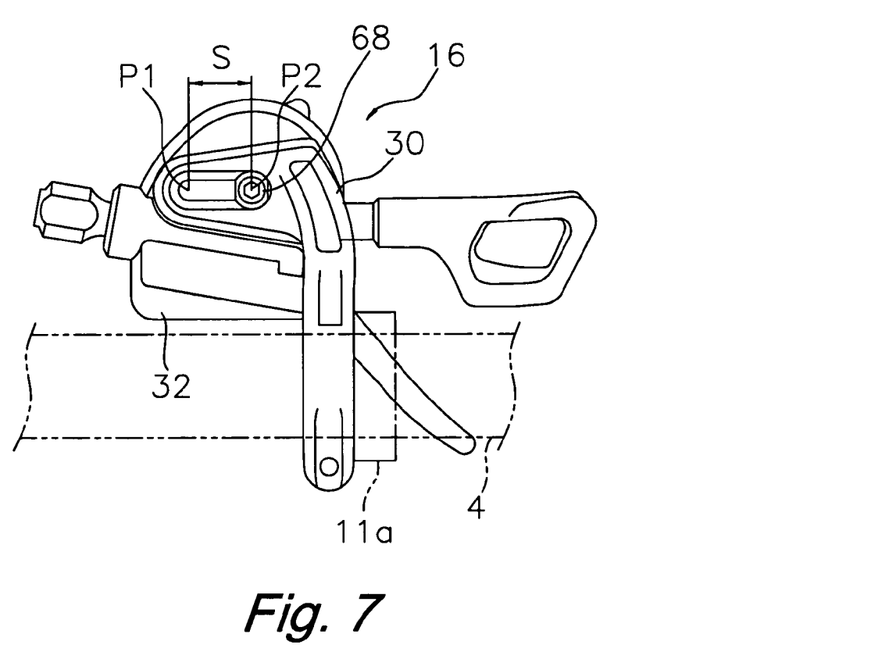
FIG. 7 is a top plan view of the rear shifter unit with the main shifter body fixed in place at the second position.

In the rear shifter unit 16 of the first embodiment, thus configured, the main shifter body 32 can be fixed in place on the mounting bracket 30 by firmly screwing the bolt 68 into the female threaded part 66. If the bolt 68 is tightened when the main shifter body 32 is fixed in place, the main shifter body 32 is guided by the rotation-stopping mechanism 70 and can move between the first position P1 shown in FIG. 6 and the second position P2 shown in FIG. 7 in the longitudinal direction in relation to the mounting bracket 30. If the bolt 68 is firmly screwed in after the main shifter body 32 is moved to the appropriate position, the main shifter body 32 can be fixed in place at an arbitrary attachment position between the first position P1 and the second position P2 in relation to the mounting bracket 30. For example, the main shifter body 32 can be fixed in place at an appropriate position near the second position P2 in cases in which the mounting bracket 30 is attached on the inside of the brake bracket 11a, and the main shifter body 32 can be fixed in place at an appropriate position near the first position P1 in cases in which the mounting bracket 30 is attached on the outside of the brake bracket 11a. Moreover, when this attachment position is adjusted, the alignment or predetermined relative angular orientation of the main shifter body 32 does not change even if the attachment position of the main shifter body 32 is varied. Therefore, the position where the main shifter body 32 is attached on the handlebar 4 can be easily varied.

Second Embodiment

Figure 8:
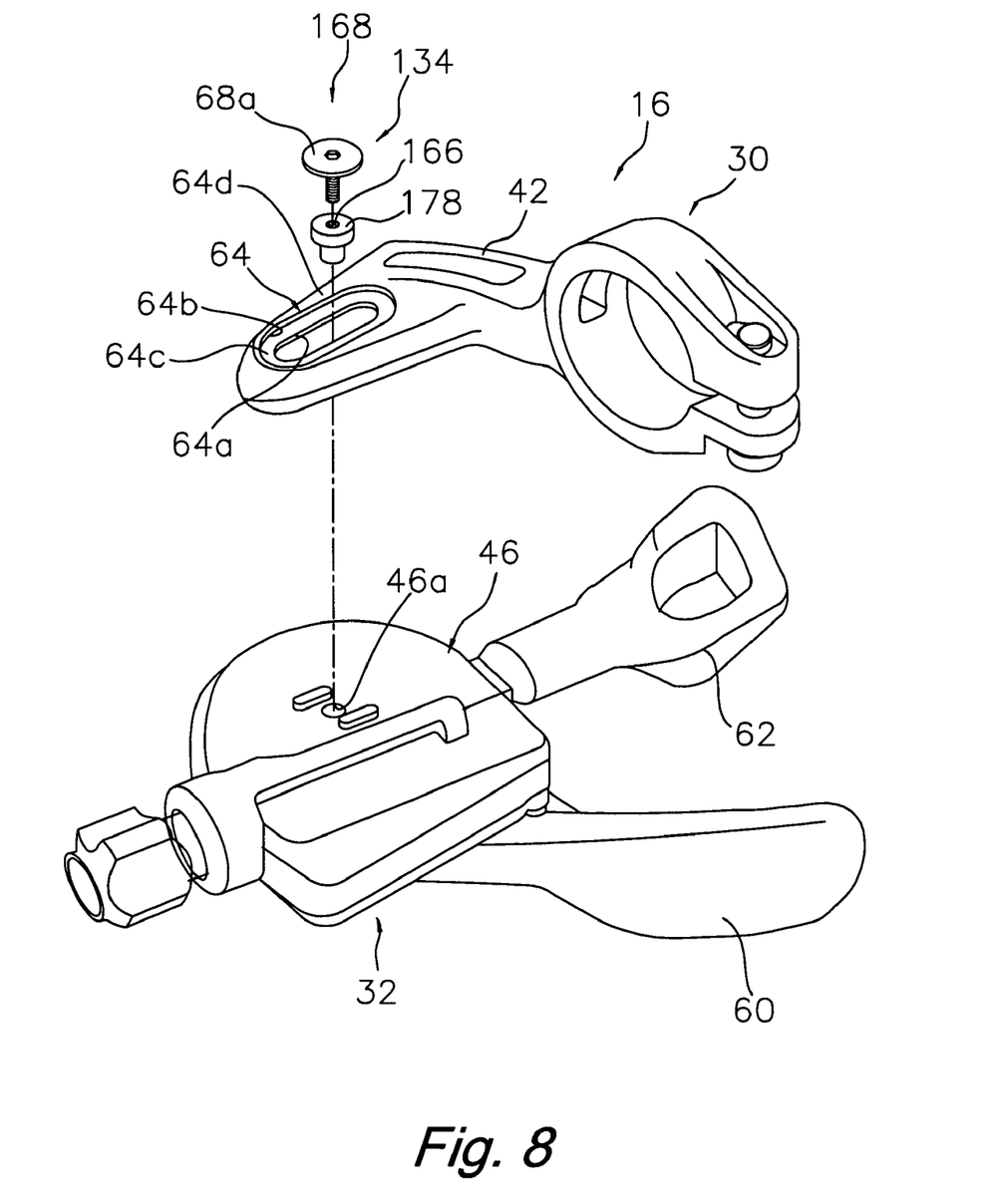
FIG. 8 is an exploded perspective view, similar to FIG. 5, of a rear shifter unit in accordance with a second embodiment of the present invention.
Figure 9:
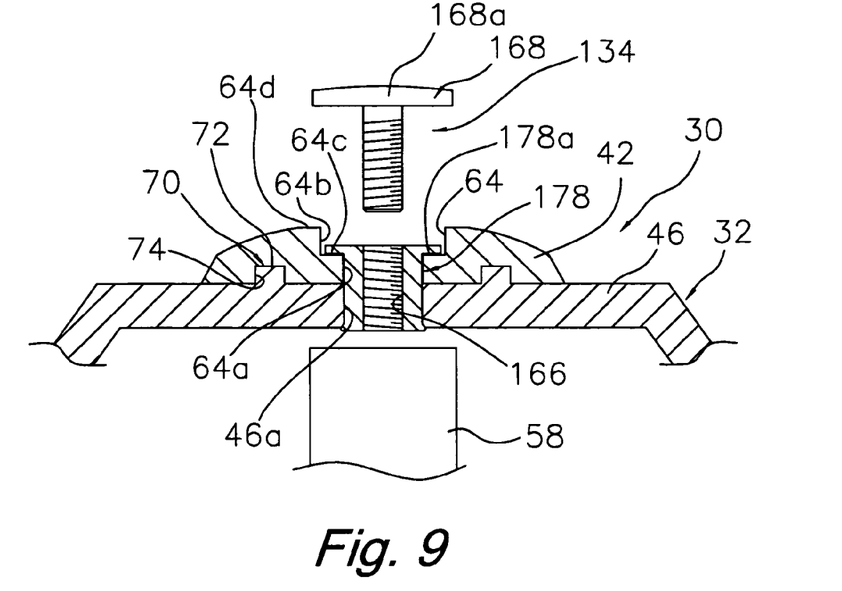
FIG. 9 is a partial cross-sectional view of the fixing mechanism for the rear shifter unit in accordance with the second embodiment of the present invention.

Referring now to FIGS. 8 and 9, a shifter in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In a second embodiment, a fixing mechanism 134 is provided with a loosening-prevention member 178 that links the mounting bracket 30 to the main shifter body 32 in order to prevent a main shifter body 132 from coming loose when a bolt 168 is removed, as shown in FIGS. 8 and 9.

The fixing mechanism 134 basically includes the slot 64 of the mounting bracket 30 (discussed above), a loosening-prevention member 178 with a female threaded part 166, and a bolt 168 that is screwed into the female threaded part 166. The bolt 168 has a larger head 168a than in the first embodiment, i.e., a head whose diameter is greater than the width of the second slot 64b. Therefore, in the second embodiment, the head 168a of the bolt 168 is secured in the top surface 64d of the attachment arm 42.

The loosening-prevention member 178 is cylindrical and can be inserted via a through-hole 46a formed in the housing 46. The female threaded part 166 is formed in this cylinder of the loosening-prevention member 178. Thus, the bolt 168 is screwed into the female threaded part 166 of the loosening-prevention member 178. At one end of the loosening-prevention member 178 (the top in FIG. 9) is a flange 178a formed so as to be capable of moving in the longitudinal direction of the first slot 64a and to catch on the step 64c. The loosening-prevention member 178 is secured on the inner walls of the housing 46 by crimping in a manner such that the other end passes through the first slot 64a and protrudes slightly from the through-hole 46a of the housing 46, as shown in FIG. 9. As a result, when the bolt 168 is removed, the main shifter body 32 is not likely to come loose from the mounting bracket 30, because the flange 178a of the loosening-prevention member 178 catches on the step 64c. The method of fixing the loosening-prevention member 178 is not limited to crimping, and adhesion, bonding, welding, or another suitable method can also be used.

In the second embodiment, when the main shifter body 32 is fixed in place on the mounting bracket 30, the bolt 168 is screwed into the female threaded part 166 and fixed in place at an arbitrary position. At this time, as previously described, the head 168a of the bolt 168 is secured into the top surface 64d of the attachment arm 42, unlike in the first embodiment. The main shifter body 32 is thereby fixed in place in the mounting bracket 30.

Third Embodiment

Figure 10:
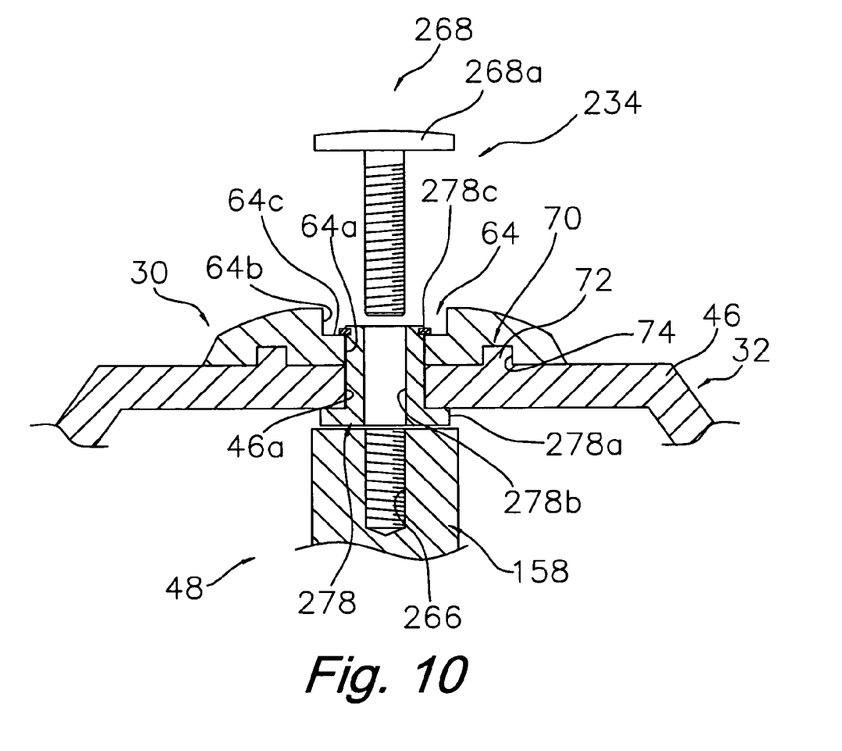
FIG. 10 is a partial cross-sectional view, similar to FIG. 9, of a fixing mechanism for a rear shifter unit in accordance with a third embodiment of the present invention.

Referring now to FIG. 10, a shifter in accordance with a third embodiment will now be explained. In view of the similarity between the third embodiment and the prior embodiments, the parts of the third embodiment that are identical to the parts of the prior embodiments will be given the same reference numerals as the parts of the prior embodiments. Moreover, the descriptions of the parts of the third embodiment that are identical to the parts of the prior embodiments may be omitted for the sake of brevity.

The shifter in accordance with this third embodiment includes the shifter mechanism 48 of the first embodiment with the winding body 52 and the positioning member 54 of the positioning mechanism 56. However, the positioning member 54 for positioning the winding body 52 are supported by a shaft member 158. In the third embodiment, as shown in FIG. 10, a loosening-prevention member 278 of a fixing mechanism 234 is cylindrical in shape and can be inserted via a through-hole 46a formed in the housing 46. A retaining ring 278c, which is formed so as to be capable of moving in the longitudinal direction of the first slot 64a and to catch on the step 64c, is located at one end (the top in FIG. 10) of the loosening-prevention member 278. A flange 278a is located around the periphery of the through-hole 46a. The flange 278a contacts the inner periphery of the housing 46. Furthermore, a through-hole 278b is formed to allow a bolt 268 to be passed through. The loosening-prevention member 278 is mounted by being run via the through-hole 46a and the first slot 64a from the inside of the housing 46, and is secured on the step 64c by the retaining ring 278c.

Also, a female threaded part 266 is formed in the top surface of a shaft member 158 of the shifter mechanism 48, and the bolt 268 is passed via the through-hole 278b and screwed into the female threaded part 266. Therefore, the screw length of the bolt 268 is greater than in the first and second embodiments. In this case, the bolt 268 is passed through the loosening-prevention member 278, and the loosening-prevention member 278 can therefore be arranged in a more compact manner than in cases in which the bolt and the loosening-prevention member are arranged separately.

Modification of Third Embodiment

Figure 11:
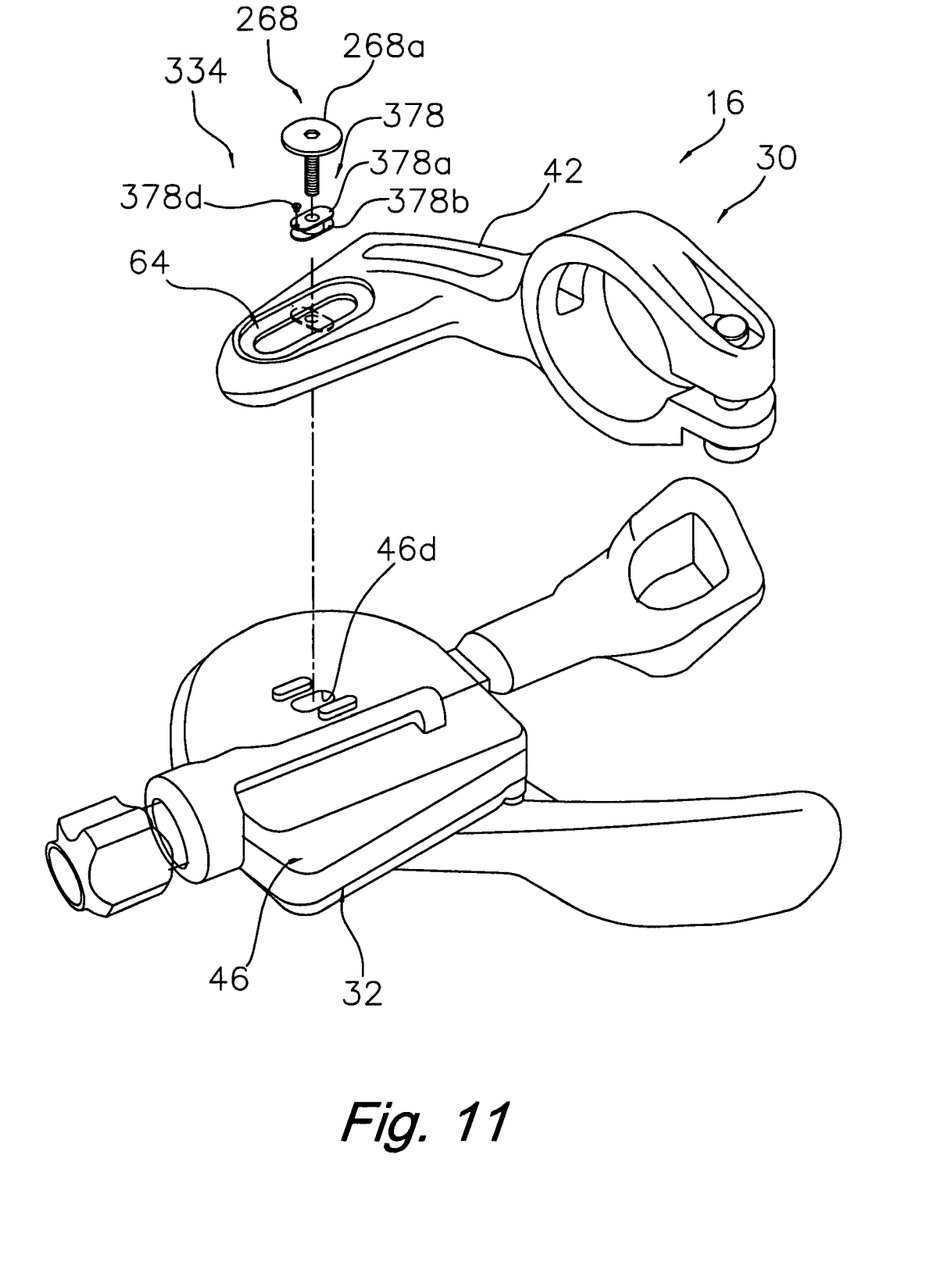
FIG. 11 is an exploded perspective view, similar to FIG. 5, of a rear shifter unit in accordance with a modification of the third embodiment of the present invention.
Figure 12:
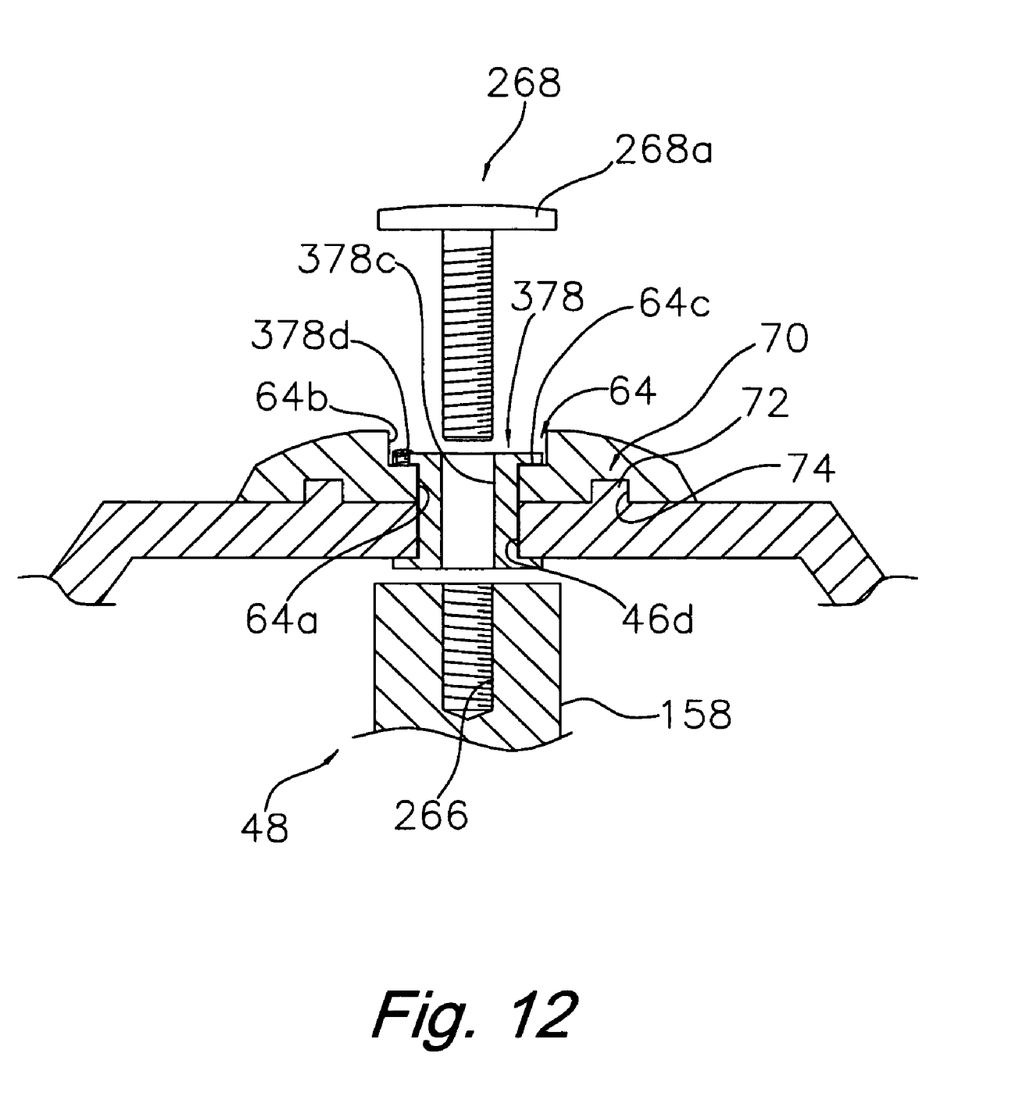
FIG. 12 is a partial cross-sectional view, similar to FIG. 9, of the fixing mechanism for the rear shifter unit in accordance with the modification of the third embodiment of the present invention.

Referring now to FIGS. 11 and 12, a modification to the shifter of the third embodiment will now be explained. In view of the similarity between the modification of the third embodiment and the prior embodiments, the parts of the modification of the third embodiment that are identical to the parts of the prior embodiments will be given the same reference numerals as the parts of the prior embodiments. Moreover, the descriptions of the parts of the modification of the third embodiment that are identical to the parts of the prior embodiments may be omitted for the sake of brevity.

In FIGS. 11 and 12, a loosening-prevention member 378 of a fixing mechanism 334 is cylindrical and has oval-shaped flanges 378a and 378b at either end. The housing 46 and the mounting bracket 30 can be coupled and released by rotating the loosening-prevention member 378 by 90 degrees between an inserted position (solid lines in FIG. 11) at which the member is inserted through the first slot 64a, and a fitted position (double-dashed lines in FIG. 11) at which the member is fitted onto the flange 378a and cannot move in the axial direction of the bolt 268. An oval-shaped insertion hole 46d is formed in the housing 46, allowing for insertion of the flange 378b disposed in an inserted configuration.

In the modification with this configuration, the mounting bracket 30 is placed on the housing 46 of the main shifter body 32 in a state in which the first slot 64a is aligned with the insertion hole 46d. The loosening-prevention member 378 is inserted through the first slot 64a and the insertion hole 46d in an inserted configuration, and the loosening-prevention member 378 is rotated by 90 degrees to the fitted position while the flange 378b is inserted through the insertion hole 46d. In this state, a small screw 378d is screwed in until the distal end reaches the step 64c, and the fitted position is achieved. The flanges 378a and 378b are thereby interlocked with the step 64c and with the inner walls of the housing 46, the housing 46 is linked with the mounting bracket 30, and the main shifter body 32 is prevented from coming loose. In this state, the main shifter body 32 can be fixed in place on the mounting bracket 30 at an arbitrary position between the first position P1 and the second position P2. This is achieved by screwing the bolt 268 into the female threaded part 266 formed in the shaft member 158.

Fourth Embodiment

Figure 13:
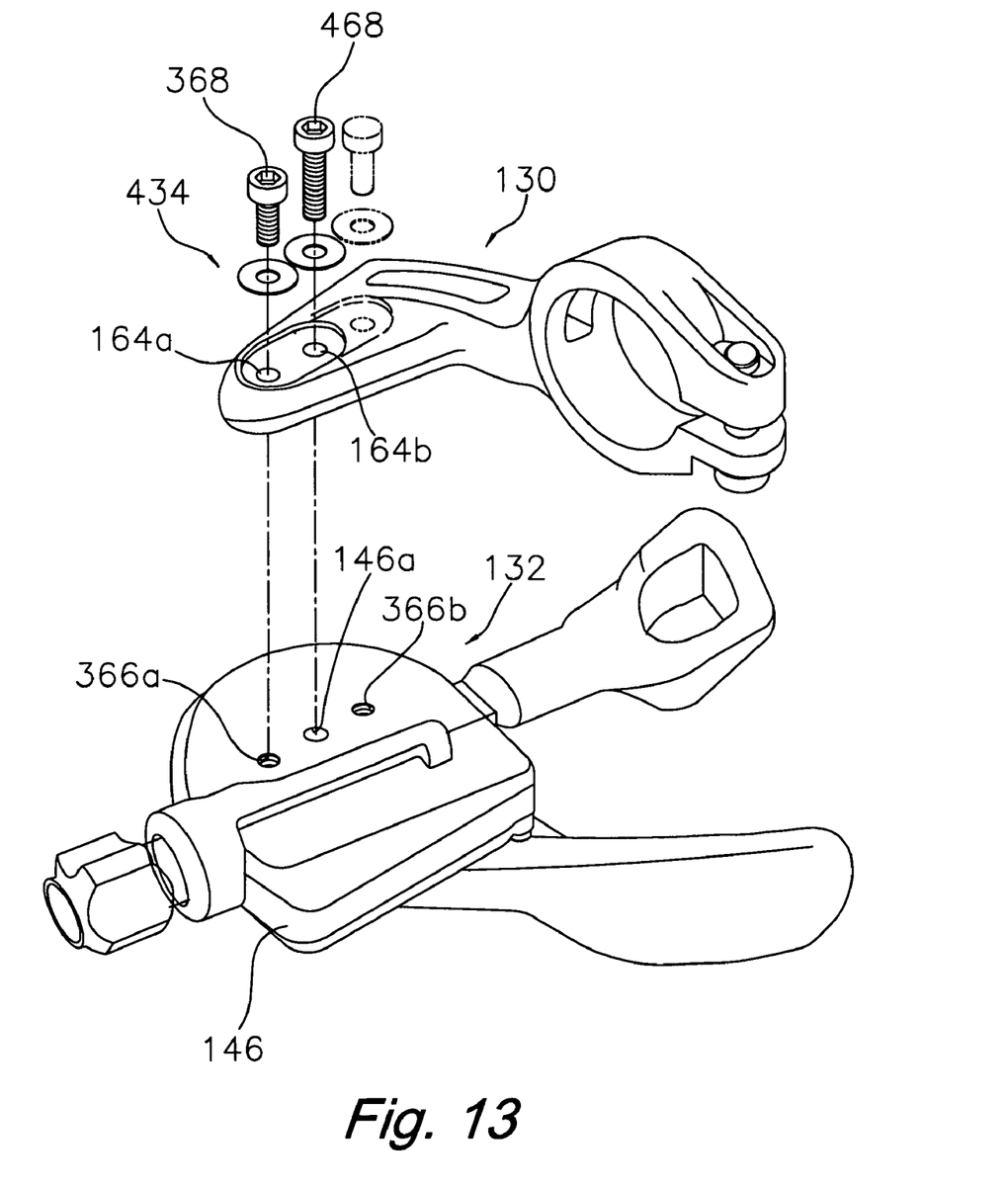
FIG. 13 is an exploded perspective view, similar to FIG. 5, of a rear shifter unit in accordance with a fourth embodiment of the present invention.

Referring now to FIG. 13, a shifter in accordance with a fourth embodiment will now be explained. In view of the similarity between the fourth embodiment and the prior embodiments, the parts of the fourth embodiment that are identical to the parts of the prior embodiments will be given the same reference numerals as the parts of the prior embodiments. Moreover, the descriptions of the parts of the fourth embodiment that are identical to the parts of the prior embodiments may be omitted for the sake of brevity.

The shifter in accordance with this fourth embodiment includes the shifter mechanism 48 of the first embodiment with the winding body 52 and the positioning member 54 of the positioning mechanism 56. However, the positioning member 54 for positioning the winding body 52 are supported by the shaft member 158 of the third embodiment shown in FIG. 12. In the previous embodiments, a slot was formed in the mounting bracket 30 in the fixing mechanism. However, another possibility for a fixing mechanism 434 is to form at least one through-hole (two through-holes 164a and 164b are used in FIG. 13) in a bracket 130 and to provide the same number of female threaded parts (two female threaded parts 366a and 366b are used in FIG. 13) as the number of through-holes 164a and 164b in the top surface of the housing 146 of the main shifter body 132. Then, fix the screws in place using the female threaded part 266 of the shaft member 158 shown in FIG. 12. In FIG. 13, a through-hole 146a is formed in the housing 146 above the female threaded part 266. Also, the bolt 368 screwed into the female threaded part 366a or 366b need not be passed through the housing 146 and is therefore shorter in length than the bolt 468 screwed into the female threaded part 266.

In this case, the main shifter body 132 is fixed in place at the first attachment position by inserting the bolt 368 via the through-hole 164a, and screwing it into the female threaded part 366a, and also by inserting the bolt 468 via the through-hole 164b and screwing it into the female threaded part 266 via the through-hole 146a. Also, the main shifter body 132 is fixed in place at the second attachment position by inserting the bolt 468 via the through-hole 164a and screwing it into the female threaded part 266 via the through-hole 146a, and by inserting the bolt 368 via the through-hole 164b and screwing it into the female threaded part 366b. Thus, with the bolt 368 being selectively screwed into one of the female threaded parts 366a and 366b and with the bolt 468 being screwed into the female threaded part 266, the main shifter body 132 can be selectively retainable in at least first and second attachment positions relative to the mounting bracket 130 in the same predetermined relative angular orientation, but with the main shifter body 132 offset longitudinally relative to the mounting bracket 130. In other words, the fixing mechanism 434 fixes the main shifter body 132 and the mounting bracket 130 together in a predetermined relative angular orientation. The main shifter body 132 is adjustable relative to the mounting bracket 130 by the bolt 368 being selectively screwed into one of the female threaded parts 366a and 366b and with the bolt 468 being screwed into the female threaded part 266 such that the main shifter body 132 is selectively retainable in at least first and second attachment positions relative to the mounting bracket 130 in the predetermined relative angular orientation. Thus, the fixing mechanism 434 includes a plurality of fixing members (the bolts 368 and 468) coupled between the main shifter body 132 and the mounting bracket 132 in a first attachment arrangement to obtain the first attachment position and in a second attachment arrangement to obtain the second attachment position.

Since the position where the main shifter body 132 is attached to the mounting bracket 130 can be varied between the first attachment position and the attachment second position by means of the bolts 368 and 468 screwed into the shaft member 158, the alignment of the main shifter body 132 does not change when the attachment position of the main shifter body 132 is varied. Therefore, the position where the main shifter body 132 is attached to the handlebar 4 can be easily varied. Moreover, this attachment is secured by using the shaft member 158, which functions as the primary shaft of the shifter mechanism, and the structure of the fixing mechanism 434 can therefore be simplified. Also, since the attachment is secured with multiple bolts, the strength of the attachment is increased, and the rotation-stopping mechanism is not needed, which simplifies the structure.

Fifth Embodiment

Figure 14:
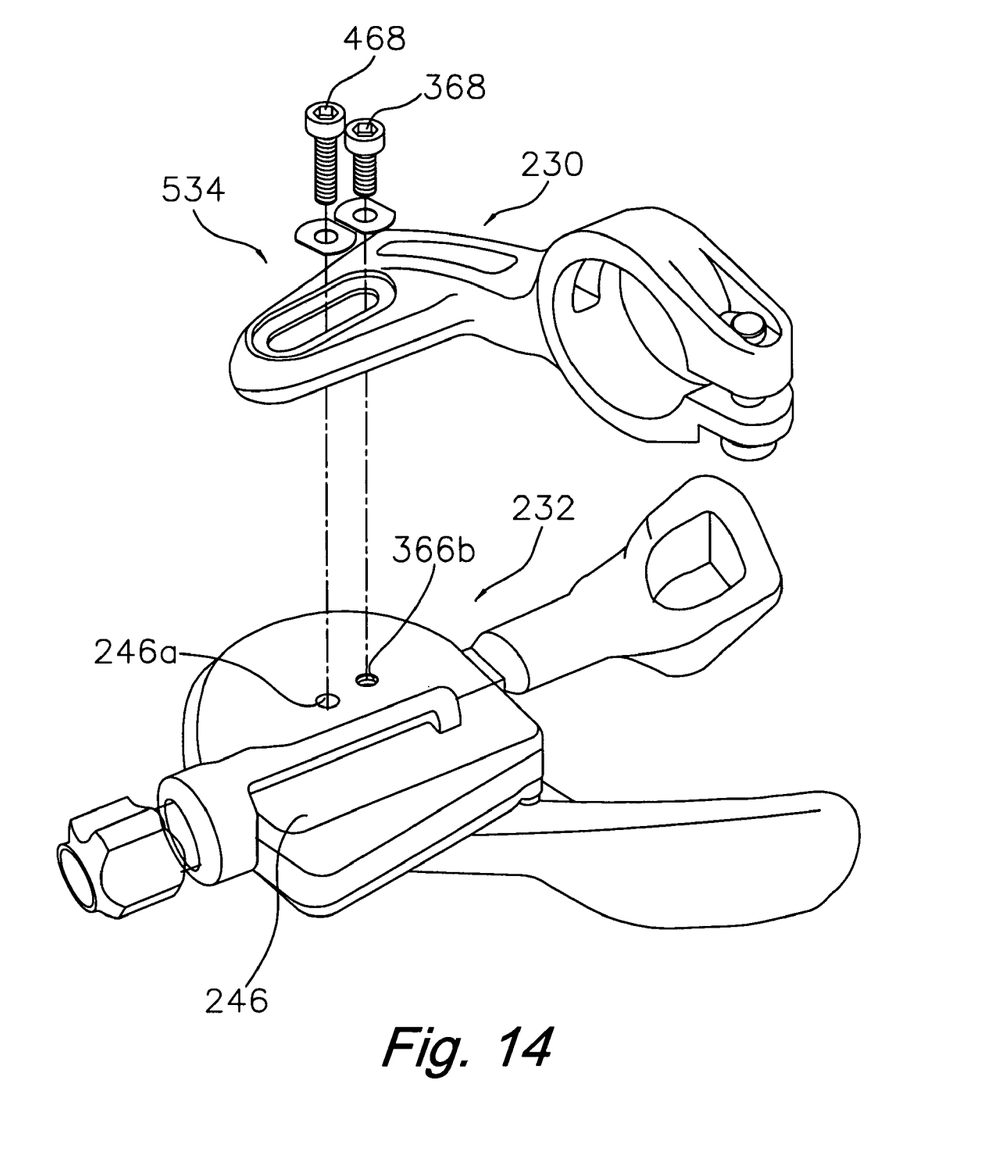
FIG. 14 an exploded perspective view, similar to FIG. 5, of a rear shifter unit in accordance with a fifth embodiment of the present invention.

Referring now to FIG. 14, a shifter in accordance with a fifth embodiment will now be explained. In view of the similarity between the fifth embodiment and the prior embodiments, the parts of the fifth embodiment that are identical to the parts of the prior embodiments will be given the same reference numerals as the parts of the prior embodiments. Moreover, the descriptions of the parts of the fifth embodiment that are identical to the parts of the prior embodiments may be omitted for the sake of brevity.

In the fifth embodiment in FIG. 14, a fixing mechanism 534 includes two bolt members 368 and 468, for example, that are used to fix a main shifter body 232 in place on a mounting bracket 230 which has a slot similar to the slot 64 of the first embodiment. A housing 246 is provided with a through-hole 246a and a female threaded part 366b, which are disposed above a female threaded part 266 of a shaft member 158 in the same manner as in FIG. 12.

In this case, with the bolt members 368 and 468 being screwed into the 366b and 266, an arbitrary attachment position can be selected between the first end attachment position and the second end attachment position by tightening the bolt members 368 and 468. Also, since the attachment is secured with multiple bolt members, the strength of the attachment is increased, and there is no need for a rotation-stopping mechanism.

Other Embodiment

In the previous embodiments, bolts were used as fixing members, but the fixing members are not limited to bolts, and nuts, elastic interlocking mechanisms, and other fixing members can be used.

In the previous embodiments, the rotation-stopping protrusions 72 were oval-shaped, but they do not necessarily need to be oval-shaped and can protrude in rectangular or circular shapes. Also, the rotation-stopping protrusions 72 can be formed on the mounting bracket 30, and the rotation-stopping recesses 74 can be formed in the housing 46 of the main shifter body 32.

In the previous embodiments, the slots were formed in the mounting brackets, and the female threaded parts were formed in the main shifter body, but another possibility is to form the slots in the main shifter body, and the female threaded parts in the mounting bracket.

In the previous embodiments, the present invention was described using the rear shifter unit as an example, but the present invention can also be applied to the front shifter unit.

In the previous embodiments, a handlebar was given as an example of the position where the shifter unit could be attached, but as long as the shifter unit can be operated manually, it can be attached at any location on the bicycle, such as the down tube.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shifter comprising:
a mounting bracket configured to be fixedly coupled to a bicycle and having two through-holes;
a main shifter body including a shifter mechanism disposed within an interior of the main shifter body; and
a fixing mechanism fixing the main shifter body and the mounting bracket together in a predetermined relative angular orientation, the main shifter body being adjustable relative to the mounting bracket by the fixing mechanism such that the main shifter body is selectively retainable in at least first and second attachment positions relative to the mounting bracket in the predetermined relative angular orientation, the fixing mechanism including a plurality of fixing members which pass through the two through-holes and which are coupled between the main shifter body and the mounting bracket in a first attachment arrangement to obtain the first attachment position and in a second attachment arrangement to obtain the second attachment position,
the fixing members including a first threaded bolt that is screwed into a first female threaded part of the main shifter body, and a second threaded bolt that is selectively screwed into a second female threaded part of the main shifter body to obtain the first attachment position and screwed into a third female threaded part of the main shifter body to obtain the second attachment position,
the first threaded bolt being longer than the second threaded bolt which is received by one of the second and third female threaded parts, the first female threaded part being disposed at a further depth from a surface of the main shifter body than the second and third female threaded parts.

2. The bicycle shifter according to claim 1, wherein the shifter mechanism including a shifter housing and a shift positioning member disposed within the shifter housing, the shift positioning member being configured to rotate around a shaft member that includes the first female threaded part at the distal end and the shifter housing includes the second and third female threaded part.

3. The bicycle shifter according to claim 1, wherein the mounting bracket is configured to be fixedly coupled on a handlebar of the bicycle, and the first and second attachment positions are disposed along a path that is generally parallel to a longitudinal direction of the handlebar.

* * * * *